United States Patent
Junghans

(12) 
(10) Patent No.: US 6,411,284 B1
(45) Date of Patent: Jun. 25, 2002

(54) METHODS AND APPARATUS FOR PROVIDING SECURE SIGNALS FROM A TOUCH PANEL DISPLAY

(75) Inventor: David Richard Junghans, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/391,767

(22) Filed: Sep. 8, 1999

(51) Int. Cl.[7] .................................................. G09G 5/00

(52) U.S. Cl. ........................................ 345/173; 345/179

(58) Field of Search ........................ 345/173, 174–180, 345/156, 157; 178/18.01–18.11, 19.01–19.07; 380/521; 713/194, 190, 200; 341/22

(56) References Cited

U.S. PATENT DOCUMENTS

| | | | | |
|---|---|---|---|---|
| 5,801,340 A | * | 9/1998 | Peter | 345/174 |
| 5,818,430 A | * | 10/1998 | Heiser | 345/174 |
| 5,841,427 A | * | 11/1998 | Teterwak | 345/173 |

* cited by examiner

Primary Examiner—Dennis-Doon Chow
(74) Attorney, Agent, or Firm—Priest & Goldstein, PLLC

(57) ABSTRACT

A system and method for providing enhanced security to signals from a touch panel display, such as the transparent touch panel displays utilized in automatic teller machines, are described. According to one aspect, a varying reference signal is input to a touch panel display. The varying reference signal is utilized by the touch panel display to generate an x-axis signal and a y-axis signal which correspond to a position touched on the touch screen. By varying the reference signal, information entered on the touch screen is difficult to reproduce in a meaningful way by a third party eavesdropping on the x-axis signal and the y-axis signal.

13 Claims, 6 Drawing Sheets

$V_X = 2/3 \, V_{REF}$
$V_Y = 1/2 \, V_{REF}$

METHODS AND APPARATUS FOR PROVIDING SECURE SIGNALS FROM A TOUCH PANEL DISPLAY

FIELD OF THE INVENTION

The present invention relates generally to improvements in touch panel displays. More specifically, the present invention relates methods and apparatus for providing enhanced security to signals from a touch panel display, such as the transparent touch panel displays utilized in automatic teller machines.

BACKGROUND OF THE INVENTION

A transparent touch panel display, or touch screen, produces electrical signals which correspond to a position on the touch screen being touched. Touch screens have found wide spread use as user input devices for electronic transaction terminal devices such as automated teller machines (ATMs) and point of sale (POS) terminals. During certain payment, cash withdrawal, or other transactions, a personal identification number (PIN) is entered on the payment terminal's touch screen by the user as a form of identification. Since this PIN is considered highly confidential, it could be extremely damaging to the user's account if a third party was able to eavesdrop on the electrical signals from a touch screen during PIN entry and reproduce those signals during a subsequent transaction to falsely identify themselves as the PIN assignee. As devices such as ATMs are located in less and less carefully supervised locations, efforts at fraud may be more determined and sophisticated. Thus, enhanced security features are highly advantageous.

Accordingly, it would be highly advantageous to provide enhanced security by preventing a third party from eavesdropping on the electrical signals produced by a touch screen during the entry of confidential information, such as a PIN or the like.

SUMMARY OF THE INVENTION

The present invention advantageously provides methods and apparatus to prevent third parties from eavesdropping on a touch screen and reproducing meaningful information from the electrical signals produced by the touch screen during the entry of a PIN or other confidential information. The touch screen may operate resistively, capacitively, or in another suitable manner. According to one aspect, the present invention provides a varying reference voltage for input to a touch screen panel. The varying reference voltage is utilized by the touch screen to generate an x-axis signal and a y-axis signal which correspond to a position touched on the touch screen. According to another aspect, the present invention provides a varying reference current for input to a touch screen panel.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which a currently preferred embodiment of the invention is shown. However, this invention may be embodied in various forms and should not be construed as limited to the exemplary embodiments set forth herein. Rather, the representative embodiment is described in detail so that this disclosure will be thorough and complete, and will fully convey the scope, structure, operation, functionality, and potential of applicability of the invention to those skilled in the art.

In the embodiments of the present invention described below, a varying reference signal is used. While the varying reference signal is described in terms of varying voltage, the present invention should not be construed as limited to varying voltage. Other suitable signal characteristics, such as varying current or varying phase, are utilized according to other aspects of the present invention.

Figure 1:
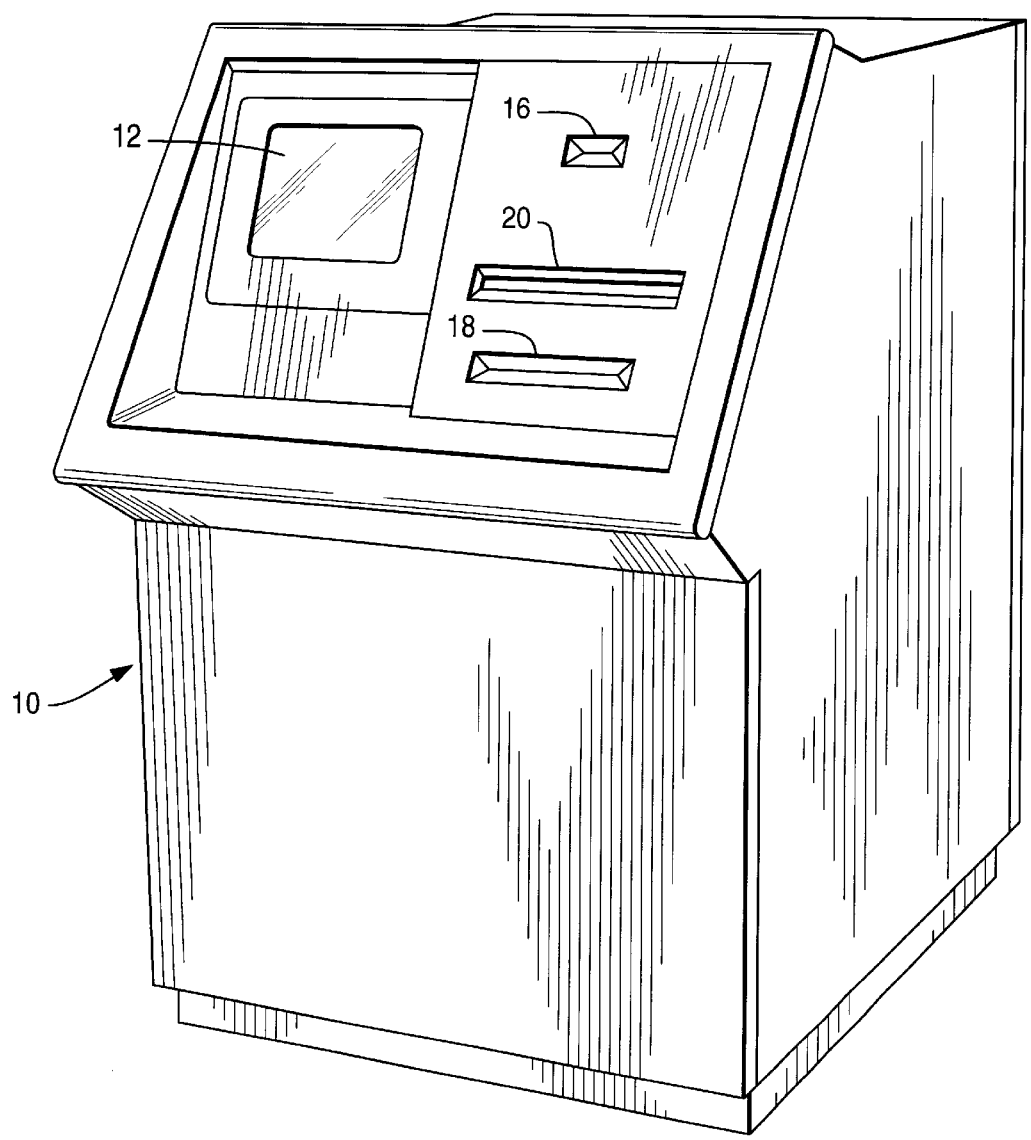
FIG. 1 shows an automated teller machine in accordance with the present invention.

Referring to the drawings, FIG. 1 shows simplified perspective view of a self-service terminal 10 such as an automated teller machine (ATM), in accordance with the present invention. The ATM 10 includes a touch screen 12, which is shown in more detail in FIG. 2. The terminal 10 may suitably include other components, depending on the use to which the terminal is applied. For example, there may be a card slot 16 for receiving a user's ID card, a slot 18 for delivering articles, such as currency notes, to the user, and a receipt slot 20 for issuing a receipt containing details of a transaction effected by the terminal 10.

Figure 2:
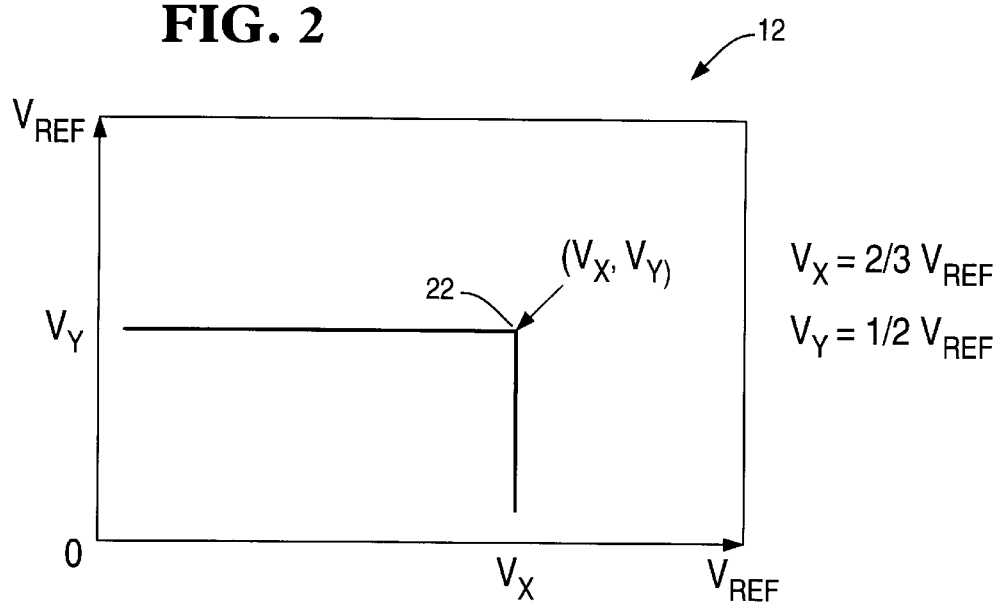
FIG. 2 shows a touch screen in accordance with the present invention.

Referring to FIG. 2, there is shown a graphical representation of the touch screen 12 with its x-axis and y-axis labeled for ease of illustration. As described below, when touched, the touch screen 12 produces electrical signals that correspond to the position on the touch screen being touched, allowing the position of the touch to be determined according to its location on the x-axis and y-axis. In the case of a resistive touch screen, the electrical signals from the touch screen 12 are relative to a reference voltage that is applied to the touch screen 12 by external circuitry. By measuring the signals ($V_X$, $V_Y$) returned from the touch screen 12 at the position of the touch and comparing them to the reference signal $V_{Ref}$, the position touched can be derived by various known methods. For example, when the touch screen is touched at a position 22 shown in FIG. 2, $V_X$ is approximately ⅔ of $V_{Ref}$ and $V_Y$ is approximately ½ of $V_{Ref}$.

Figure 3:
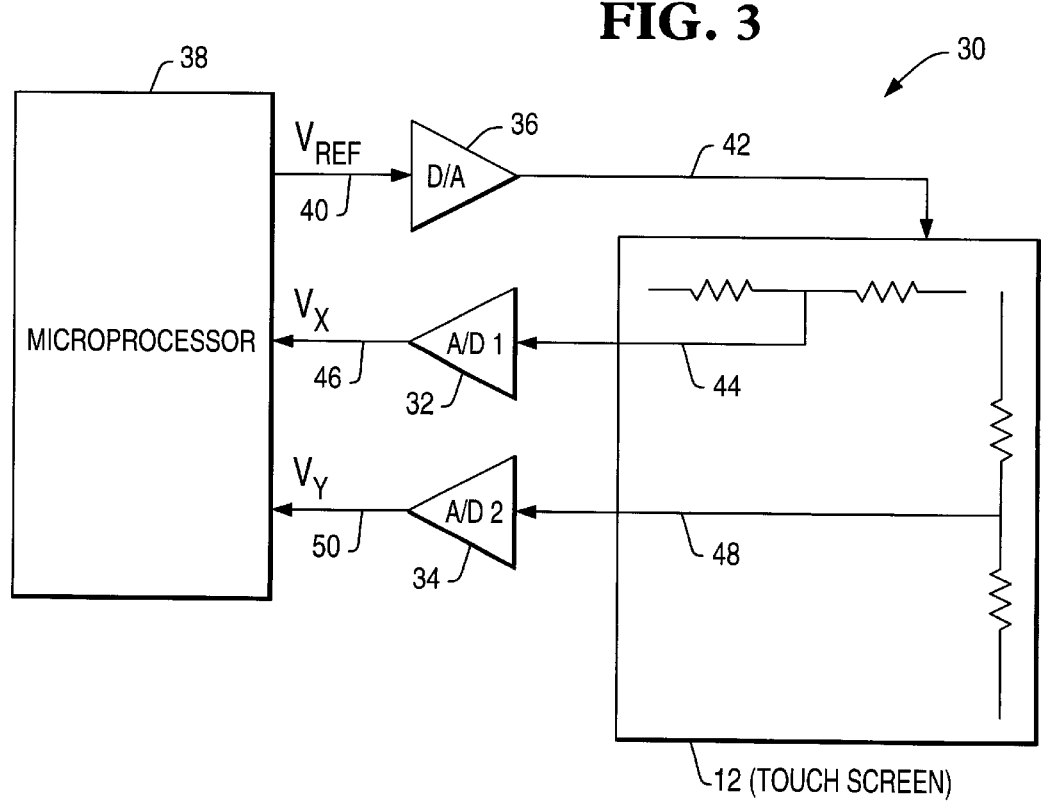
FIG. 3 shows a block diagram of a touch screen and touch screen circuitry in accordance with the present invention.

Referring to FIG. 3, there is shown a diagram of touch screen circuitry 30 in accordance with the present invention. The circuitry 30 includes the touch screen 12, an x-axis analog-to-digital (A/D) converter 32, an y-axis A/D converter 34, a digital-to-analog (D/A) converter 36, and a microprocessor 38. As shown in FIG. 3, the microprocessor 38 is connected to the touch screen 12 through the x-axis A/D converter 32, the y-axis A/D converter 34, and the D/A converter 36.

The D/A converter 36 receives a digital $V_{Ref}$ signal 40 generated by the processor 38 and produces a corresponding analog $V_{Ref}$ signal 42 which is input to the touch screen 12. The x-axis A/D converter 32 receives an analog $V_X$ signal 44 from the touch screen 12 and produces a corresponding digital $V_X$ signal 46 which is input to the microprocessor 38. The y-axis A/D converter 34 receives an analog $V_Y$ signal 48 from the touch screen 12 and produces a corresponding digital $V_Y$ signal 50 which is input to the microprocessor 38. The microprocessor 38 controls the reference voltage 40 and determines the position touched on the touch screen by comparing the $V_{Ref}$ signal 40 with the digital $V_X$ signal 46 and the digital $V_Y$ signal 50.

Figure 4:
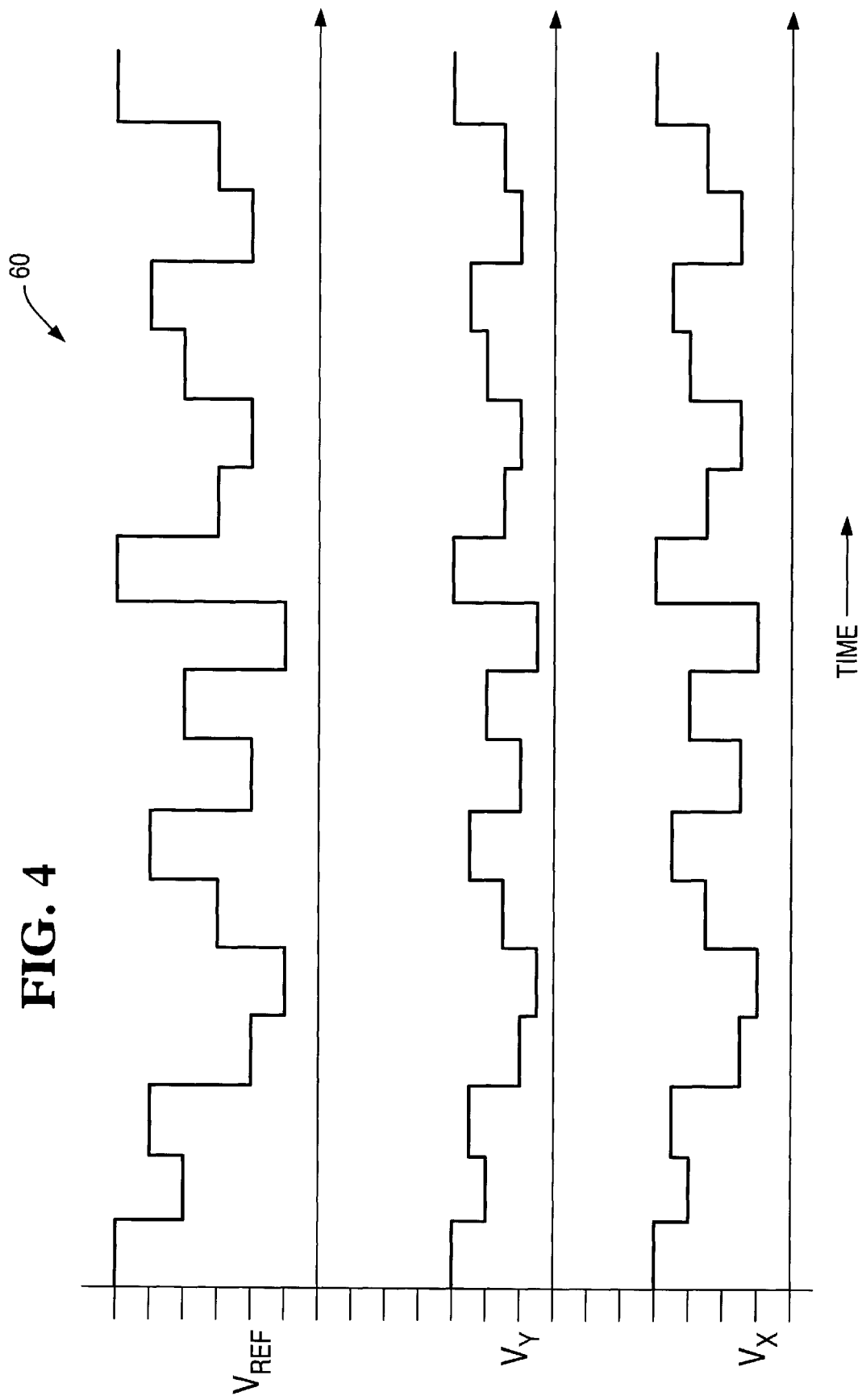
FIGS. 4, 5 and 6 show exemplary varying signal waveforms for use in conjunction with the touch screen and circuitry of FIGS. 2 and 3.
Figure 5:
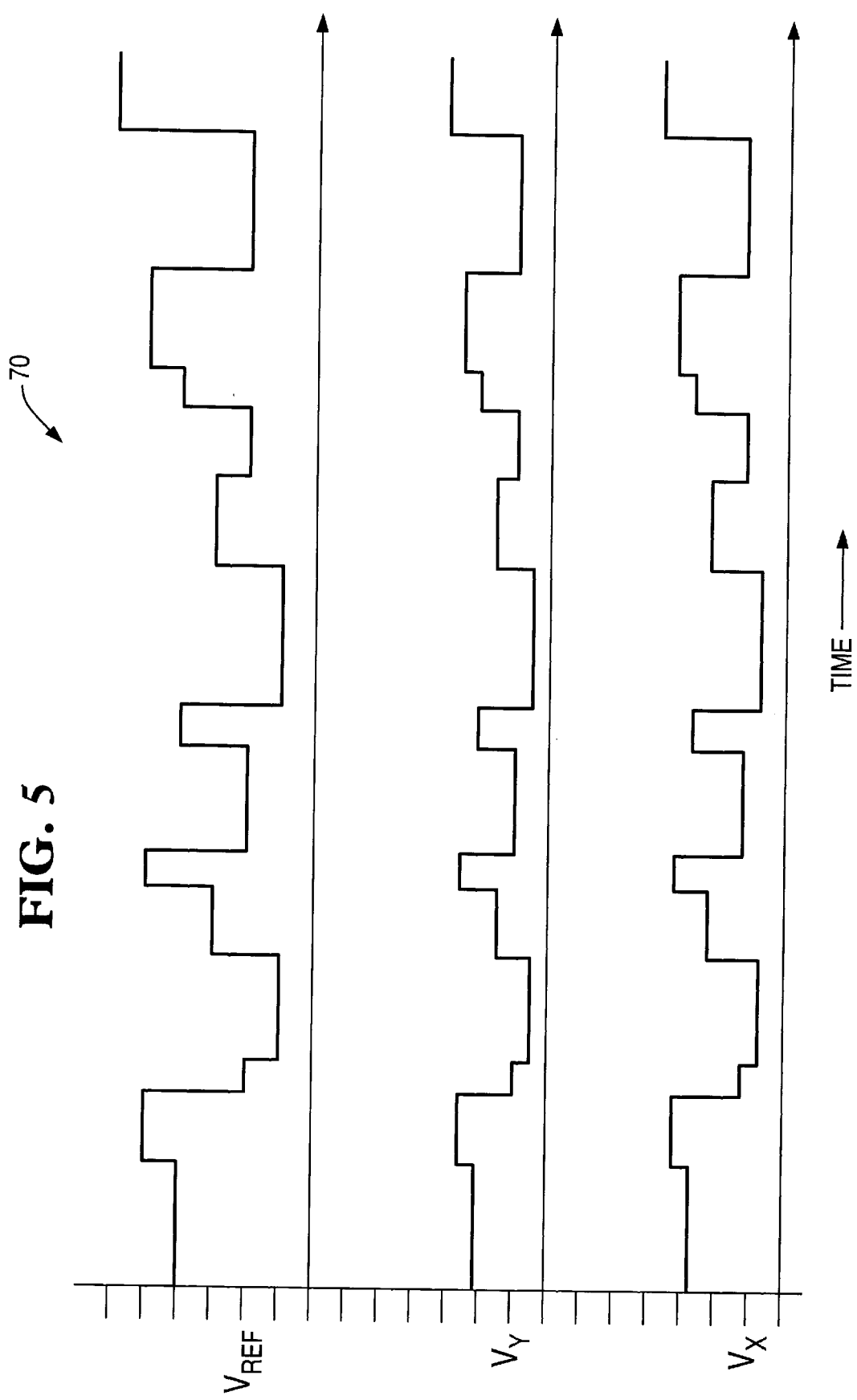

FIGS. 4 and 5 show timing diagrams 60 and 70, respectively, of the signal waveforms resulting from a continuous touch at the position 22 of FIG. 2. As shown in the signal timing diagrams 60 and 70, the microprocessor 38 provides a varying reference signal $V_{Ref}$ signal 40 to the D/A converter 36, which results in a corresponding varying analog $V_{Ref}$ signal 42 being input to the touch screen 12. The $V_X$ signal 46 and the $V_Y$ signal 50 returned to the processor are determined with respect to the varying signal 40. The reference signal $V_{Ref}$ 40 may be varied according to a random generation sequence, a predetermined algorithm, a look-up table, or some other suitable mechanism for controlling voltage variation to substantially decrease the likelihood that an eavesdropper on the signal will gain useful information.

The reference signal 40 and the signals 46 and 50 are synchronized in time to correctly identify a given position. In other words, the signals 46 and 50 returned from the touch screen 12 at a given point in time are meaningful only when the reference signal 40 at that point in time is known by the microprocessor 38. Thus, the information entered on the touch screen 12 corresponding to signals 46 and 50 is extremely difficult to reproduce by electronically eavesdropping on signals 44 and 48. This advantageously prevents a third party from eavesdropping on the touch screen output signals 44 and 48 entered during a valid session and later reproducing those signals during an invalid session to gain illegal access to another person's funds.

Figure 6:
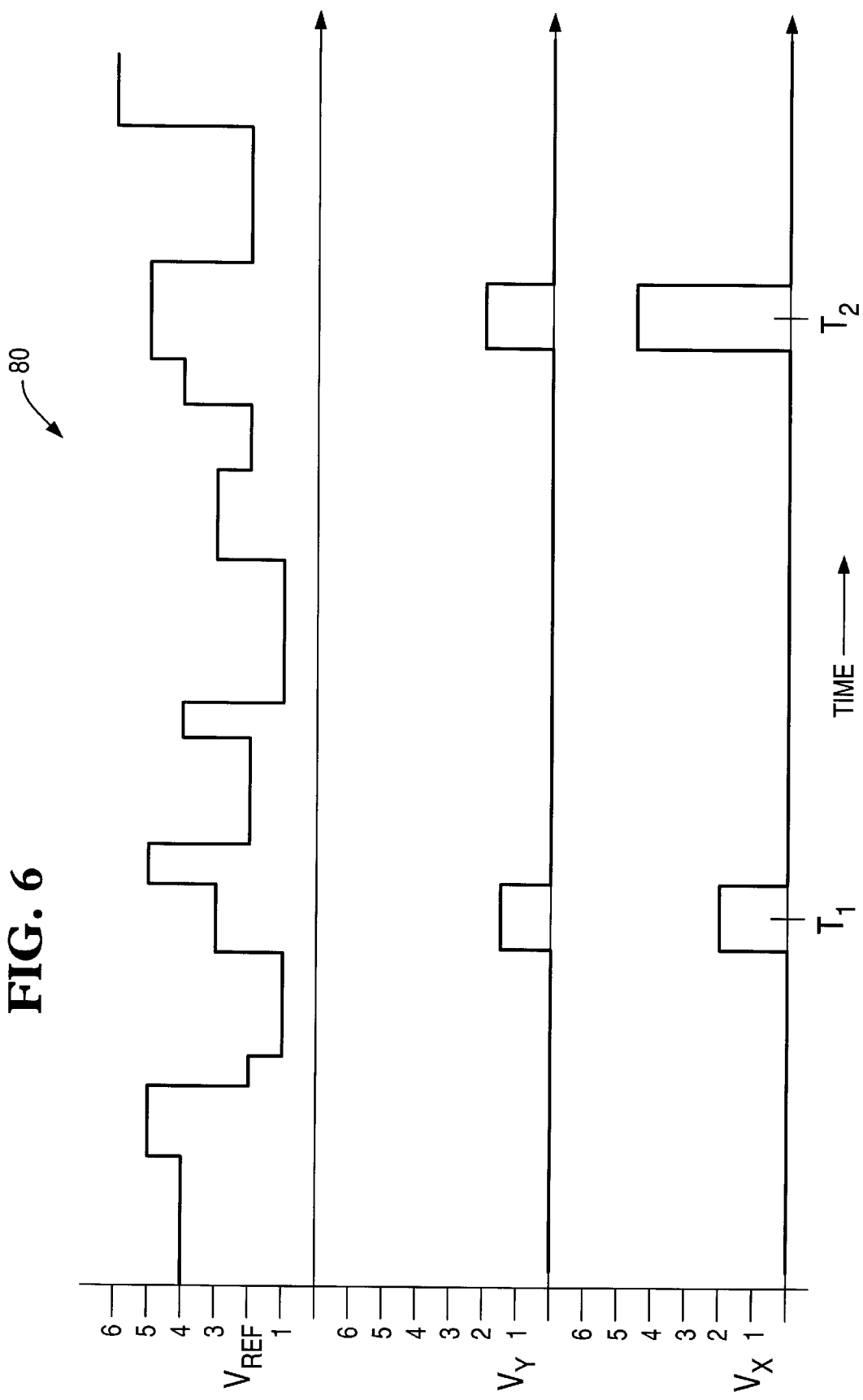

As an example, assume that a position of the numeral "5" on the touch screen 12 of FIG. 1 corresponds to the point $V_X(5)$, $V_Y(5)$, where $V_X(5)=0.6V_{Ref}$ and $V_Y(5)=0.6V_{Ref}$, and that a position of the numeral "9" corresponds to the point $V_X(9)$, $V_Y(9)$, where $V_X(9)=0.8V_{Ref}$ and $V_Y(5)=0.4V_{Ref}$. Further, assume that $V_{Ref}$ has a range of 0 to 6 volts. FIG. 6 shows an exemplary timing diagram 80 of the signal waveforms resulting from a touch of the numeral "5" at time $T_1$ followed by a touch of the numeral "9" at time $T_2$. At time $T_1$, $V_{Ref}=3V$ and thus $V_X(5)=1.8V$ and $V_Y(5)=1.8V$. At time $T_2$, $V_{Ref}=5V$ and thus $V_X(9)=4.5V$ and $V_Y(9)=2.0V$.

Figure 7:
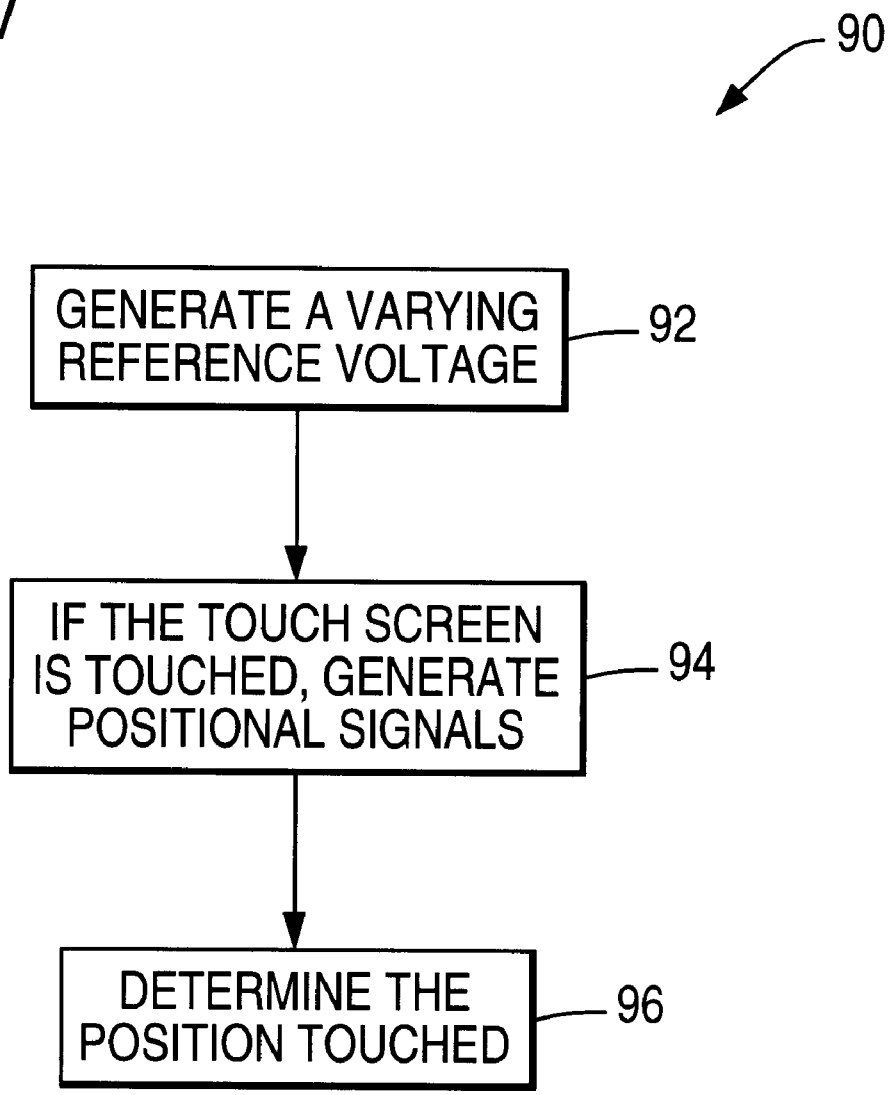
FIG. 7 shows a flowchart of a method of providing enhanced security on a touch screen in accordance with the present invention.

FIG. 7 shows a method 90 of providing enhanced security to a touch screen in accordance with the present invention. In a first step 90, a varying reference signal (such as signal $V_{Ref}$) is delivered to a touch screen (such as touch screen 12). When the touch screen is touched, in a second step 92, positional signals (such as positional signals $V_X$ and $V_Y$) are generated based upon the position touched and the reference signal. In step 94, the position touched is determined utilizing the positional signals and the value of the reference signal corresponding to the point in time when the screen was touched.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

I claim:

1. A touch panel system comprising:

a touch panel which generates a positional signal when the touch panel is touched at a location, wherein the magnitude of the positional signal at the time of the touch is determined by the magnitude of a reference signal at the time of the touch; and an apparatus operating to generate the reference signal, vary the magnitude of the reference signal and receive the positional signal, said apparatus determining the touched location by comparing the magnitude of the reference signal and the magnitude of the positional signal at the time of the touch.

2. The touch panel system of claim 1 wherein the apparatus comprises a microprocessor.

3. The touch panel system of claim 1 wherein the apparatus randomly varies the magnitude of the reference signal.

4. The touch panel system of claim 1 wherein the apparatus varies the magnitude of the reference signal according to a predetermined algorithm.

5. A touch panel system comprising:

a touch panel which generates a first positional signal and a second positional signal when the touch panel is touched at a location, wherein both the magnitude of the first positional signal and the magnitude of the second positional signal are determined by the location touched and the magnitude of a reference signal at the time of the touch;

an apparatus operating to generate the reference signal, vary the magnitude of the reference signal and receive the first positional signal and the second positional signal, said apparatus determining the touched location by comparing the magnitude of the reference signal with the magnitude of the first positional signal and the magnitude of the second positional signal.

6. The touch panel system of claim 5 wherein:

the first positional signal corresponds to the position touched along a x-axis; and the second positional signal corresponds to the position touched along a y-axis.

7. The touch panel system of claim 5 wherein:

the touch panel is a resistive touch panel.

8. The touch panel system of claim 5 wherein:

the touch panel is a capacitive touch panel.

9. A method of determining a position touched on a touch panel comprising the steps of:

generating a varying reference signal;

generating a first positional signal and a second positional signal based upon both the position touched and the varying reference signal, the magnitude of the first positional signal and the magnitude of the second positional signal being determined by the location touched and the magnitude of the varying reference signal at the time of the touch; and determining the position touched by comparing the magnitude of the first positional signal and the magnitude of the second positional signal with the magnitude of the varying reference signal at the time of the touch.

10. The method of claim 9 wherein the step of varying the reference signal includes varying a voltage level of the varying reference signal.

11. The method of claim 9 wherein the step of varying the reference signal includes varying a current level of the varying reference signal.

12. A touch panel system comprising:

a touch panel generating a first positional signal and a second positional signal when the touch panel is touched at a location, the magnitude of the first positional signal and the magnitude of the second positional signal determined by both the location touched and the magnitude of a reference signal received by the touch panel at the time of the touch, said reference signal having frequency components;

means for generating the reference signal;

means for varying both the magnitude and the frequency components of the reference signal;

means for receiving the first positional signal and the second positional signal; and means for determining the touched location by comparing the magnitude of the reference signal with the magnitude of the first positional signal and the magnitude of the second positional signal at the time of the touch.

13. The touch panel system of claim 12 wherein both the first positional signal and the second positional signal are relative to the reference signal.

* * * * *